United States Patent [19]

Weber et al.

[11] 3,843,633
[45] Oct. 22, 1974

[54] DIVINYL-DIPHENYL COMPOUNDS

[75] Inventors: Kurt Weber; Hans Schläpfer, both of Basel, Switzerland

[73] Assignee: Ciba-Geigy AG, Basel, Switzerland

[22] Filed: Dec. 18, 1972

[21] Appl. No.: 316,156

[30] Foreign Application Priority Data
Dec. 30, 1971  Switzerland...................... 19171/71

[52] U.S. Cl.......................... 260/240 C, 8/65, 8/73, 96/1.6, 96/122, 106/176, 106/193, 117/33.5 R, 117/33.5 T, 117/139.4, 117/139.5, 117/142, 117/143 R, 162/162, 252/301.2 W, 252/543
[51] Int. Cl.............................................. C09b 23/00
[58] Field of Search ................................ 260/240 C

[56] References Cited
UNITED STATES PATENTS
| | | | |
|---|---|---|---|
| 3,579,511 | 5/1971 | Weber et al. | 260/240 C |
| 3,637,673 | 1/1972 | Okubo et al. | 260/240.9 |

FOREIGN PATENTS OR APPLICATIONS
| | | | |
|---|---|---|---|
| 1,805,371 | 8/1969 | Germany | 260/240.9 |
| 2,025,792 | 12/1970 | Germany | 260/240 D |
| 2,212,480 | 9/1972 | Germany | 260/240 C |

*Primary Examiner*—John D. Randolph
*Attorney, Agent, or Firm*—Joseph G. Kolodny; Edward McC. Roberts; Prabodh I. Almaula

[57] ABSTRACT

New sulphonated divinyl-diphenyl compounds of the formula

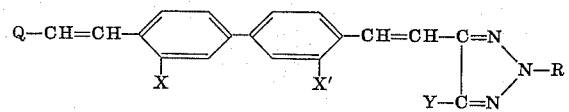

wherein
R represents a phenyl, naphthyl or diphenylyl radical which may be substituted by non-chromophoric groups
Y represents hydrogen, chlorine, bromine, alkyl or a phenyl, naphthyl or diphenylyl radical which may be substituted by non-chromophoric groups,
Q represents a phenyl, naphthyl or diphenylyl radical which may be substituted by non-chromophoric groups or a radical

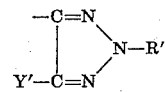

wherein
R' represents a phenyl, naphthyl or diphenylyl radical which may be substituted by non-chromophoric groups and
Y' represents hydrogen, chlorine, bromine alkyl or a phenyl, naphthyl or diphenylyl radical which may be substituted by non-chromophoric groups and
X and X' independently of one another represent hydrogen, halogen, alkyl or alkoxy with 1 to 4 carbon atoms or the sulphonic acid groups or its salts, with the number of the sulphonic acid groups or their salts in the molecule having to be 1 to 4. These compounds are particularly useful as optical brighteners.

6 Claims, No Drawings

DIVINYL-DIPHENYL COMPOUNDS

The present invention relates to new 4,4'-divinyl-diphenyl compounds, their use for the optical brightening of organic materials, and processes for their manufacture.

The new compounds correspond to the formula (1)

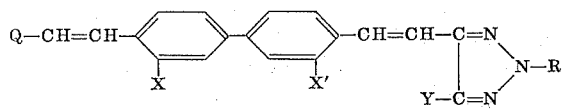

wherein R represents optionally non-chromophorically substituted phenyl, naphthyl or diphenylyl, Y represents hydrogen, chlorine, bromine, alkyl (preferably with 1 to 6 carbon atoms) or optionally non-chromophorically substituted phenyl, naphthyl or diphenylyl, Q represents optionally non-chromophorically substituted phenyl, naphthyl or diphenylyl or a radical

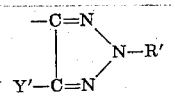

wherein R' represents optionally non-chromophorically substituted phenyl, naphthyl or diphenylyl and Y' represents hydrogen, chlorine, bromine, alkyl (preferably with 1 to 6 carbon atoms) or optionally non-chromophorically substituted phenyl, naphthyl or diphenylyl and X and X' independently of one another represent hydrogen, halogen, alkyl or alkoxy with 1 to 4 carbon atoms or the sulphonic acid group or its salts, with the number of the sulphonic acid groups or of their salts in the molecule having to be 1 to 4. Accordingly, both the central diphenylyl radical (in the symbols X and X') and also the symbols R, R', Q, Y and Y', where they are of aromatic nature, can contain sulpho groups or their salts.

Possible substituents of the phenyl, naphthyl or diphenylyl radicals (in the definition of Q, R, R', Y or Y') are above all halogen, preferably chlorine, alkyl with 1 to 4 carbon atoms, alkenyloxy with 3 or 4 carbon atoms, optionally substituted alkoxy, preferably with 1 to 12 carbon atoms, optionally substituted benzyloxy and of course the sulpho group or its salts. Substituents of the alkoxy radical which are to be mentioned here are especially halogen, hydroxyl, alkoxy with 1 to 4 carbon atoms, nitrile, the sulphonic acid group and the carboxylic acid group (including its esters and amides) and substituents of the benzyloxy radical which are to be mentioned are alkyl or alkoxy with 1 to 4 carbon atoms or halogen, preferably chlorine. The number of the substituents on a phenyl, naphthyl or diphenylyl (4)

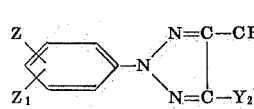

radical in general does not exceed 2. Phenyl is preferred amongst the series phenyl, naphthyl and diphenyl.

The sulphonic acid groups present in the salt form are mostly their alkali metal, alkaline earth metal, ammonium or amine salts. The sodium and potassium salts are preferred.

Within the framework of the formula (1) compounds of predominant interest are those of the formula (2)

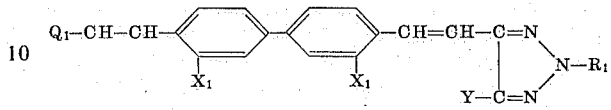

wherein $R_1$ represents phenyl optionally substituted by the sulphonic acid group or its salts, halogen, alkyl with 1 to 4 carbon atoms, alkenyloxy with 3 or 4 carbon atoms or optionally substituted alkoxy or benzyloxy, $Y_1$ represents hydrogen, chlorine, alkyl with 1 to 6 carbon atoms or phenyl, naphthyl or diphenylyl optionally substituted by the sulphonic acid group or its salts, halogen, alkyl with 1 to 4 carbon atoms, alkenyloxy with 3 or 4 carbon atoms or optionally substituted alkoxy or benzyloxy, $Q_1$ represents phenyl optionally substituted by the sulpho group or its salts, halogen, alkyl with 1 to 4 carbon atoms, alkenyloxy with 3 or 4 carbon atoms or optionally substituted alkoxy or benzyloxy or represents a radical

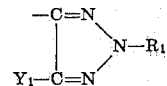

wherein $Y_1$ and $R_1$ have the indicated meaning and $X_1$ represents hydrogen, halogen, alkyl or alkoxy with 1 to 4 carbon atoms or a sulphonic acid group or its salts, with the number of the sulphonic acid groups or of their salts in the molecule being 1 to 4.

At the same time, compounds to be singled out are those of the formulae (3)

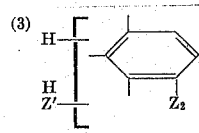

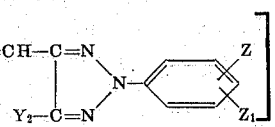

wherein Z and Z' independently of one another denote hydrogen, the sulphonic acid groups or their alkali metal, alkaline earth metal, ammonium or amine salts, fluorine, chlorine, bromine, alkyl with 1 to 4 carbon atoms or alkoxy with 1 to 4 carbon atoms, $Z_1$ denotes hydrogen, fluorine, chlorine, bromine, alkyl with 1 to 4 carbon atoms or alkoxy with 1 to 4 carbon atoms, $Z_2$ denotes the sulphonic acid group or its alkali metal, alkaline earth metal, ammonium or amine salts and $Y_2$ denotes hydrogen, chlorine, alkyl with 1 to 4 carbon atoms or phenyl optionally substituted by chlorine, alkyl with 1 to 4 carbon atoms, alkoxy with 1 to 4 carbon atoms or the sulphonic acid group or its alkali metal, alkaline earth metal, ammonium or amine salts, with the number of the sulphonic acid groups or of their alkali metal, alkaline earth metal, ammonium or amine salts in the molecule being 1 to 4, and

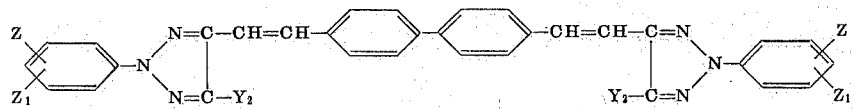

wherein Z denotes hydrogen, the sulphonic acid group or its alkali metal, alkaline earth metal, ammonium or amine salts, fluorine, chlorine, bromine, alkyl with 1 to 4 carbon atoms or alkoxy with 1 to 4 carbon atoms, $Z_1$ denotes hydrogen, fluorine, chlorine, bromine, alkyl with 1 to 4 carbon atoms or alkoxy with 1 to 4 carbon atoms and $Y_2$ denotes chlorine, hydrogen, alkyl with 1 to 4 carbon atoms, alkoxy with 1 to 4 carbon atoms or phenyl optionally substituted by chlorine, alkyl with 1 to 4 carbon atoms, alkoxy with 1 to 4 carbon atoms or the sulphonic acid group or its alkali metal, alkaline earth metal, ammonium or amine salts, with the number of the sulphonic acid groups or of their alkali metal, alkaline earth metal, ammonium or amine salts in the molecule being 2 or 4.

Compounds of particular practical interest are those of the formulae (5)
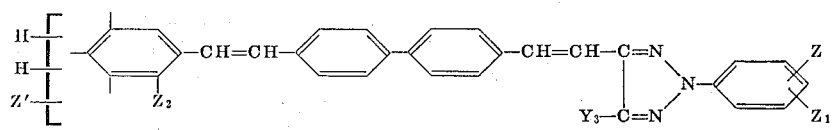

wherein Z, Z', $Z_1$ and $Z_2$ have the indicated meaning and $Y_3$ represents hydrogen or methyl, (6)
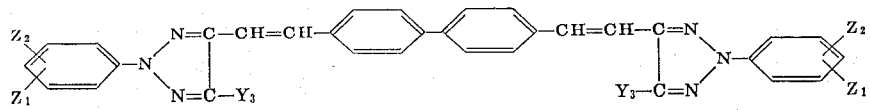

wherein $Z_1$, $Z_2$ and $Y_3$ have the indicated meaning, (7)
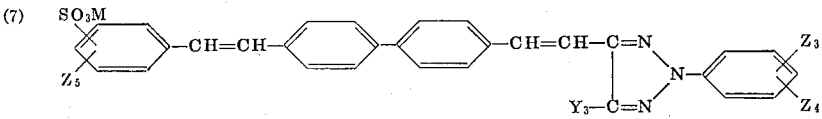

wherein $Z_3$ denotes hydrogen, fluorine, chlorine, bromine, methyl, ethyl or methoxy, $Z_4$ denotes hydrogen, bromine or methyl, $Z_5$ denotes hydrogen, the sulphonic acid group or its sodium or potassium salt, chlorine or methyl, $Y_3$ denotes hydrogen or methyl and M denotes hydrogen, sodium or potassium, (8)
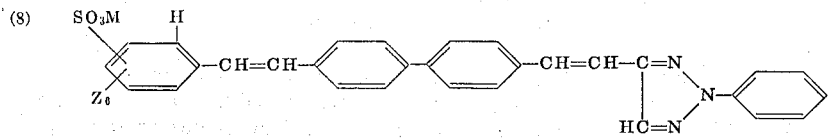

wherein $Z_6$ denotes hydrogen or chlorine and M denotes hydrogen, sodium or potassium and (9)
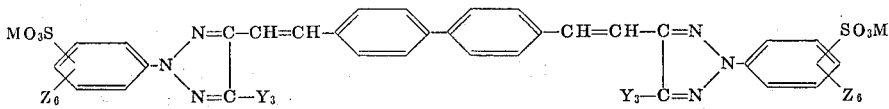

wherein $Z_6$ denotes hydrogen or chlorine, $Y_3$ denotes hydrogen or methyl and M denotes hydrogen, sodium or potassium.

Within the framework of the formulae (5), (6), (7) and (9), compounds wherein $Y_3$ represents hydrogen are preferred.

The compounds of the formula (1) or of subordinate formulae can be manufactured analogously to processes which are in themselves known.

In general, the procedure followed is to react about 1 mol equivalent of a compound of the formula

(10) 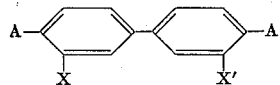

with about 1 mol equivalent of a compound of the formula $$Q-A_1 \quad (11)$$

and about one mol equivalent of a compound of the formula

(12) 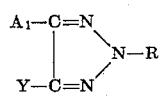

with X, X', Q, Y, and R having the above mentioned meaning and one of the symbols A and $A_1$ denoting a

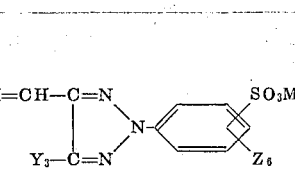

group and the other denoting a grouping of the formula

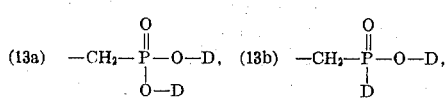

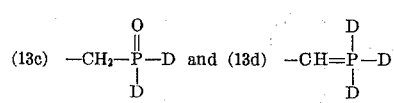

wherein D represents an alkyl radical which is optionally substituted further, preferably a radical with up to 6 carbon atoms, an aryl radical, preferably a phenyl radical, a cycloalkyl radical, preferably a cyclohexyl radical, or an aralkyl radical, preferably a benzyl radical.

Accordingly, for example, dialdehydes of the formula

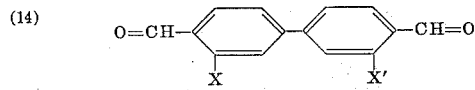

can be reacted with monofunctional compounds of the formula

(15)

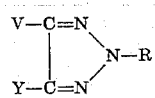

(16)

or monoaldehydes of the formula (17)

(18)

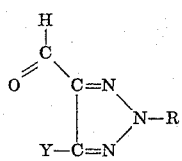

can be reacted with bifunctional compounds of the formula (19)

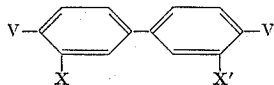

wherein X, X', Q, Y and R have the abovementioned meaning and V denotes one of the phosphorus-containing substituents of the formulae (13a) to (13d).

The phosphorus compounds of the formulae (15), (16) and (19) here required as starting substances are obtained in a manner which is in itself known by reacting halogenomethyl compounds, preferably chloromethyl or bromomethyl compounds, of the formulae Q — CH₂ — Halogen, (20)

(21) 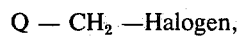

or

(22) 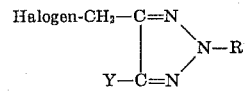

with phosphorus compounds of the formulae

(23)      

(24)      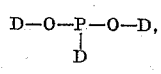

(25)      

or

(26)      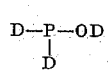

In these formulae, D has the indicated meaning, with radicals D bonded to oxygen preferably being lower alkyl groups whilst radicals D directly bonded to phosphorus are preferably aryl radicals such as benzene radicals. The phosphorus compound of the formula (13c) can also be obtained by reaction of halogenomethyl compounds, preferably chloromethyl or bromomethyl compounds, of the formulae (20), 21) or (22) with p-chlorodiphenylphosphine, and subsequent reaction with an alcohol of the formula D—OH (meaning of D as defined above), for example with methanol or with water.

The aldehydes required as starting substances are known or can be manufactured according to known methods.

A variant of particular practical importance consists of using, as diphenyl components according to the formula (10), those which correspond to the formula

(27) 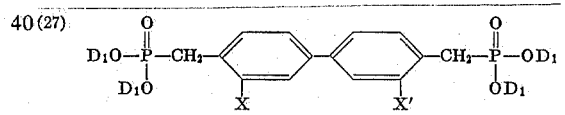

wherein D₁ denotes an alkyl group with 1 to 6 carbon atoms.

The manufacturing process is advantageously carried out in inert solvents. As examples thereof there may be mentioned hydrocarbons, such as toluene and xylene or alcohols such as methanol, ethanol, isopropanol, butanol, glycols, glycol-ethers such as 2-methoxyethanol, hexanols, cyclohexanol and cyclooctanol, and also ethers such as diisopropyl ether, tetrahydrofurane and dioxane as well as dimethylsulphoxide, formamide and N-methylpyrrolidone. Polar organic solvents such as dimethylformamide and dimethylsulphoxide are particularly suitable. Some of the reactions can also be carried out in aqueous solution.

The temperature at which the reaction is carried out can vary within wide limits. It is determined ($\alpha$) by the stability of the solvent used towards the reactants, especially towards the strongly basic alkali compounds, ($\beta$) by the reactivity of the condensation partners and ($\gamma$) by the activity of the combination of solvent-base as a condensation agent.

In practice, accordingly, temperatures between about 10° and 100°C can in general be employed, especially if dimethylformamide or dimethylsulphoxide is used as the solvent. The preferred temperature range is 20° to 60°C. However, under certain circumstances higher temperatures can also be used, if this is desired in order to save time or if a less active but cheaper condensation agent is to be employed. Accordingly, reaction temperatures in the range of 10° to 180°C are in principle also possible.

Possible strongly basic alkali compounds are above all the hydroxides, amides and alcoholates (preferably those of primary alcohols containing 1 to 4 carbon atoms) of the alkali metals, with those of lithium, sodium and potassium being of predominant interest for economic reasons. However in principle, and in special cases, it is also possible successfully to use alkali metal sulphides and alkali metal carbonates, aryl-alkali metal compounds such as, for example, phenyl-lithium, or strongly basic amines (including ammonium bases, for example trialkylammonium hydroxides).

If it is desired to arrive at compounds according to the formula (1) which are asymmetrical in the external members, mixtures of asymmetrically substituted compounds according to the formula (1) and of the two corresponding symmetrically substituted compounds are in most cases first obtained by the process described above, as a result of competing reaction of the three reactants. These components can be separated on the basis of their differing solution behaviour in water, the water-insoluble compound being separated off by filtration. The water-soluble compounds remaining in the filtrate can then be separated on the basis of their different solubility in water.

A further process consists of reacting a compound of the formula

(28)
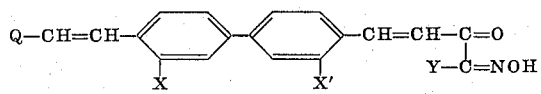

with a hydrazine of the formula $$H_2N - NH - R$$

(29)

and cyclising the resulting oxime-hydrazone of the formula

(30)
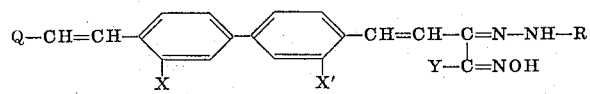

to give the compound of the formula (1).

Symmetrical compounds are obtained analogously by reaction of one mol of a compound of the formula

(31)
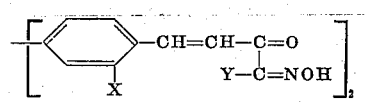

with 2 mols of a hydrazine of the formula (29) and cyclisation of the oxime-hydrazone thereby obtained, of the formula

(32)
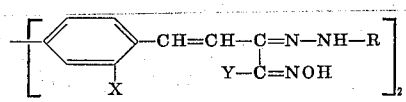

The reaction of a compound of the formula (28) or (31) with a compound of the formula (29) is in general carried out in an organic solvent which is inert towards the reactants, for example optionally halogenated aliphatic or aromatic hydrocarbons, alcohols, ethers, glycols, formamide, dimethylformamide, acetonitrile and the like, or in a low molecular alkanecarboxylic acid, such as acetic acid or propionic acid, at a temperature of 10° to 100°C, preferably 30° to 70°C. The cyclisation of the isolated oxime-hydrazone of the formula (30) or (32) to give the compound of the formula (1) is appropriately effected by means of agents which split off water, for example anhydrides or halides of alkanecarboxylic acids, such as acetic anhydride or propionic acid chloride or phosporus halides, such as phosphorus trichloride or phosphorus pentachloride. For this, a temperature range of 10° to 160°C, preferably of 30° to 120°C is in general used. When employing acid halides the reaction can be carried out in an organic solvent which is inert towards the oxime-hydrazone and the acid halide, such as optionally halogenated hydrocarbons, ethers, dimethylformamide and the like. If an anhydride is employed as the agent for splitting off acid, the reaction can be allowed to take place in an excess thereof, optionally in the presence of a further solvent. The cyclisation to give the triazole of the formula (1) can also be effected by heating with urea to temperatures of 100° to 210°C, preferably 120° to 180°C, in which case, in general, a 2-fold to 20-fold amount of urea, relative to the dry weight of the hydrazone, is employed.

The compounds of the formula (1) and of subordinate formulae can further be manufactured according to the "Meerwein arylation" (compare R. Adams, Organic Reactions, Volume 11, page 169 (New York 1960). Herein, a compound of the formula

(33)
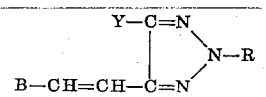

wherein B denotes a negative substituent, such as acetyl, carboxyl, nitrile or an optionally substituted carboxylic acid ester or carboxylic acid amide group, is arylated by means of the diazonium salt of an amine of the formula

(34)
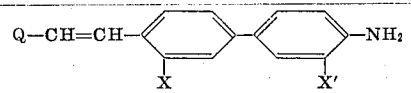

with the substituent B being split off simultaneously or subsequently.

This arylation is in general carried out in an aqueous or aqueous-organic phase, such as water-acetone, water-methanol, water-ethanol and the like, at temperatures of −10° to 60°C, preferably at 20° to 40°C, and in the presence of copper salts, optionally in the presence of a buffer which is effective in the acid range, for example acetic acid-sodium acetate, monosodium phosphate, monosodium tartrate and the like.

The new compounds defined above are colourless to, at most, slightly coloured and show a more or less pronounced fluorescence in the dissolved or finely divided state. They can be used for the optical brightening of the most diverse synthetic, semi-synthetic or natural organic materials or substances which contain such organic materials.

The following groups of organic materials, where optical brightening thereof is relevant, may be mentioned as examples of the above, without the survey given below being intended to express any restriction thereto:

I. Synthetic organic high molecular materials:
   a. Polymerisation products based on organic compounds containing at least one polymerisable carbon-carbon double bond, that is to say their homopolymers or copolymers as well as their after-treatment products such as, for example, cross-linking, grafting or degradation products, polymer blends, or products obtained by modification of reactive groups, for example polymers based on $\alpha,\beta$-unsaturated carboxylic acids or derivatives of such carboxylic acids, especially on acrylic compounds (such as, for example, acrylic esters, acrylic acid, acrylonitrile, acrylamides and their derivatives or their methacryl analogues), of olefine hydrocarbons (such as, for example, ethylene, propylene, styrenes or dienes and also so-called ABS polymers), and polymers based on vinyl and vinylidene compounds (such as, for example, vinyl chloride, vinyl alcohol and vinylidene chloride),
   b. Polymerisation products such as are, for example, obtainable by ring opening, for example, polyamides of the polycaprolactam type, and also polymers which are obtainable both via polyaddition and via polycondensation, such as polyethers or polyacetates,
   c. Polycondensation products or precondensates based on bifunctional or polyfunctional compounds possessing condensable groups, their homocondensation and co-condensation products, and after-treatment products, such as, for example, polyesters, especially saturated (for example ethylene glycol terephthalic acid polyester) or unsaturated (for example maleic aciddialcohol polycondensates as well as their crosslinking products with copolymerisable vinyl monomers), unbranched and branched (also including those based on polyhydric alcohols, such as, for example alkyd resins) polyesters, polyamides (for example hexamethylenediamine adipate), maleate resins, melamine resins, their precondensates and analogues, polycarbonates and silicones,
   d. Polyaddition products such as polyurethanes (crosslinked and non-crosslinked) and epoxide resins.
II. Semi-synthetic organic materials such as, for example, cellulose esters of varying degrees of esterification (so-called 2½ acetate or triacetate) or cellulose ethers, regenerated cellulose (viscose or cuprammonium cellulose), or their after-treatment products, and casein plastics.
III. Natural organic materials of animal or vegetable origin, for example based on cellulose or proteins, such as cotton, wool, linen, silk, natural lacquer resins, starch and casein.

The organic materials to be optically brightened can be in the most diverse states of processing (raw materials, semi-finished goods or finished goods). On the other hand, they can be in the form of structures of the most diverse shapes, say for example predominantly three-dimensional bodies such as sheets, profiles, injection mouldings, various machined articles, chips, granules or foams, and also as predominantly two-dimensional bodies such as films, foils, lacquers, coatings, impregnations and coatings, or as predominantly one-dimensional bodies such as filaments, fibres, flocks and wires. The said materials can, on the other hand, also be in an unshaped state, in the most diverse homogeneous or inhomogeneous forms of division, such as, for example, in the form of powders, solutions, emulsions, dispersions, latices, pastes or waxes.

Fibre materials can, for example, be in the form of endless filaments (stretched or unstretched), staple fibres, flocks, hanks, textile filaments, yarns, threads, fibre fleeces, felts, waddings, flock structures or woven textile fabrics, textile laminates, knitted fabrics and papers, cardboards or paper compositions.

The compounds to be used according to the invention are of importance, inter alia, for the treatment of organic textile materials, especially woven textile fabrics. Where fibres, which can be in the form of staple fibres or endless filaments or in the form of hanks, woven fabrics, knitted fabrics, fleeces, flock substrates or laminates, are to be optically brightened according to the invention, this is advantageously effected in an aqueous medium, wherein the compounds in question are present in a finely divided form (suspensions, so-called microdispersions or possibly solutions). If desired, dispersing agents, stabilisers, wetting agents and further auxiliaries can be added during the treatment.

Depending on the type of brightener compound used, it may prove advantageous to carry out the treatment in a neutral or alkaline or acid bath. The treatment is usually carried out at temperatures of about 20° to 140°C, for example at the boiling point of the bath or near it (about 90°C). Solutions or emulsions in organic solvents can also be used for the finishing, according to the invention, of textile substrates, as is practised in the dyeing trade in so-called solvent dyeing (pad-thermofix application, or exhaustion dyeing processes in dyeing machines).

The new optical brighteners according to the present invention can further be added to, or incorporated in, the materials before or during their shaping. Thus they can for example be added to the compression moulding composition or injection moulding composition during the manufacture of films, sheets (for example, hot milling into polyvinyl chloride) or mouldings.

Where fully synthetic or semi-synthetic organic materials are being shaped by spinning processes or via spinning compositions, the optical brighteners can be applied in accordance with the following processes:

Addition to the starting substances (for example monomers) or intermediates (for example precondensates or prepolymers), that is to say before or during the polymerisation, polycondensation or polyaddition, Powdering onto polymer chips or granules for spinning compositions, Bath dyeing of polymer chips or granules for spinning compositions, Metered addition to spinning melts or spinning solutions, and Application to the tow before stretching.

The new optical brighteners according to the present invention can, for example, also be employed in the following use forms:
   a. Mixed with dyestuffs (shading) or pigments (coloured pigments or especially, for example, white pigments), or as an additive to dye baths, printing pastes, discharge pastes or reserve pastes, or for the after-treatment of dyeings, prints or discharge prints.

b. Mixed with so-called "carriers", wetting agents, plasticisers, swelling agents, anti-oxidants, light protection agents, heat stabilisers and chemical bleaching agents (chlorite bleach or bleaching bath additives).

c. Mixed with crosslinking agents or finishing agents (for example starch or synthetic finishes), and in combination with the most diverse textile finishing processes, especially synthetic resin finishes (for example creaseproof finishes such as "wash-and-wear", "premanent-press" or "no-iron "), as well as flameproof finishes, soft handle finishes, anti-soiling finishes or anti-static finishes, or antimicrobial finishes.

d. Incorporation of the optical brighteners into polymeric carriers (polymerisation or polyaddition products), in a dissolved or dispersed form, for use, for example, in coating agents, impregnating agents or binders (solutions, dispersions and emulsions) for textiles, fleeces, paper and leather.

e. As additives to so-called "master batches."

f. As additives to the most diverse industrial products in order to render these more marketable (for example improving the appearance of soaps, detergents, pigments), g. In combination with other optically brightening substances, h. In spinning bath preparations, that is to say as additives to spinning baths such as are used for improving the slip for the further processing of synthetic fibres, or from a special bath before the stretching of the fibre.

i. As scintillators for various purposes of a photographic nature, such as, for example, for electrophotographic reproduction or supersensitisation, and for the optical brightening of photographic layers, optionally in combination with white pigments such as, for example, $TiO_2$.

If the brightening process is combined with textile treatment methods or finishing methods, the combined treatment can in many cases advantageously be carried out with the aid of appropriate stable preparations, which contain the optically brightening compounds in such concentration that the desired brightening effect is achieved.

In certain cases, the brighteners are made fully effective by an after-treatment. This can, for example, represent a chemical treatment (for example acid treatment), a thermal treatment (for example heat) or a combined chemical/thermal treatment. Thus, for example, the appropriate procedure to follow in optically brightening a series of fibre substrates, for example of polyester fibres, with the brighteners according to the invention is to impregnate these fibres with the aqueous dispersions (or optionally also solutions) of the brighteners at temperatures below 75°C, for example at room temperature, and to subject them to a dry heat treatment at temperatures above 100°C, it being generally advisable additionally to dry the fibre material beforehand at a moderately elevated temperature, for example at not less than 60°C and up to about 130°C. The heat treatment in the dry state is then advantageously carried out at temperatures between 120° and 255°C, for example by heating in a drying chamber, by ironing within the specified temperature range or by treatment with dry, superheated steam. The drying and dry heat treatment can also be carried out in immediate succession or be combined in a single process stage.

The amount of the new optical brighteners to be used according to the invention, relative to the material to be optically brightened, can vary within wide limits. A distinct and durable effect is already achievable with very small amounts, in certain cases, for example, amounts of 0.0005 per cent by weight. However, amounts of up to about 0.8 per cent by weight and optionally of up to about 2 per cent by weight can be employed. For most practical purposes, amounts between 0.005 and 0.5 per cent by weight are of preferred interest.

The new optical brightening agents are also particularly suitable for use as additives for wash liquors or industrial and domestic washing agents, to which they can be added in various ways. They are appropriately added to wash liquors in the form of their solutions in water or organic solvents or in a finely divided form, as aqueous dispersions. They are advantageously added to domestic or industrial washing agents in any stage of the manufacturing process of the washing agents, for example to the so-called "slurry" before spray-drying the washing powder, or during the preparation of liquid washing agent combinations. They can be added either in the form of a solution or dispersion in water or other solvents or, without auxiliaries, as a dry brightening powder. For example, the brightening agents can be mixed, kneaded or ground with the detergent substances and, in this form, admix the finished washing powder. However, they can also be sprayed in a dissolved or pre-dispersed form onto the finished washing agent.

Possible washing agents are the known mixtures of detergent substances such as, for example, soap in the form of chips and powders, synthetics, soluble salts of sulphonic acid half esters of higher fatty alcohols, arylsulphonic acids with higher and/or multiple alkyl substituents, sulphocarboxylic acid esters of medium to higher alcohols, fatty acid acrylaminoalkyl-or acylaminoaryl-glycerinesulphonates, phosphoric acid esters of fatty alcohols and the like. Possible so-called "builders" which can be used are, for example, alkali metal polyphosphates and polymetaphosphates, alkali metal pyrophosphates, alkali metal salts of carboxymethylcellulose and other "soil redeposition inhibitors," and also alkali metal silicates, alkali metal carbonates, alkali metal borates, alkali metal perborates, nitrilotriacetic acid, ethylenediaminotetraacetic acids, and foam stabilisers such as alkanolamides of higher fatty acids. The washing agents can further contain for example: antistatic agents, skin protection agents which restore fat, such as lanolin, enzymes, anti-microbial agents, perfumes and dyestuffs.

The brighteners according to the invention can also be employed in the washing agents together with other brighteners, especially those which are derivatives of 4,4'-diaminostilbene-2,2'-disulphonic acid, of 1,3-diphenylpyrazoline, of stilbyl-4-naphthotriazole, of 4,4'-distyryl-biphenyl, of 1,4-distyrylbenzene, of coumarine or of naphthostyryl.

The new optical brighteners have the particular advantage that they are also active in the presence of active chlorine donors such as, for example, hypochlorite, and can be used without significant loss of the effects in wash liquors containing non-ionic washing agents, for example alkylphenol polyglycol ethers.

The compounds according to the invention are added in amounts of 0.001 –2 percent, preferably 0.005 –1 percent, relative to the weight of the liquid or pulverulent finished washing agent. Washing liquors which contain the indicated amounts of the optical brighteners claimed impart a brilliant appearance in daylight when used to wash textiles of cellulose fibres, polyamide fibres, cellulose fibres with a high quality finish, polyester fibres, wool and the like.

The washing treatment is carried out as follows, for example:

The textiles indicated are treated for 1 to 30 minutes at 20° to 100°C in a wash liquor which contains 1 to 10 g/l of a built-up composite washing agent and 0.05 to 1 percent, relative to the weight of the washing agent, of the claimed brightening agents. The liquor ratio can be 1:3 to 1:50. After washing, the textiles are rinsed and dried in the usual manner. The wash liquor can contain 0.2 g/l of active chlorine (for example as hypochlorite) or 0.1 to 2 g/l of sodium perborate as a bleaching additive.

Within the framework of the present invention it is also possible without difficulty —depending on the special applicational requirements —to employ the new compounds which have been described mixed with the corresponding compounds of symmetrical structure, obtainable from the competing reaction of the manufacturing process, for the competing reaction of the manufacturing process, for the purpose of optical brightening. This means that in the practice of applying the compounds it is also possible — depending on the end use —to dispense with separating the competing reaction products. If appropriate, a symmetrical water-insoluble compound can be separated off, whilst a mixture of the water-soluble compounds is employed for the purpose of optical brightening.

If appropriate it is possible, in order to reduce the proportion of the symmetrical water-insoluble compound in the reaction mixture, to carry out the reaction by employing, per mol equivalent of the bifunctional reactant used, a total of about 2 mol equivalents of monofunctional reactants, in which the ratio of component containing sulphone groups to component free of sulphone groups can lie approximately in the molar ratio of between 1:1 and 10:1.

EXAMPLE 1

41.0 g of 4,4'-bis-(dimethoxyphosphonomethyl)-diphenyl, 22.2g of the sodium salt of benzaldehyde-2-sulphonic acid (containing the equivalent of 83.8 percent of free sulphonic acid) and 18.0 g of 2-phenyl-1,2,3-triazol-4-aldehyde are dissolved in 200 ml of anhydrous dimethylformamide at 40°C whilst stirring and displacing the air by nitrogen. 14.4 g of sodium methylate (content: 97.8 percent) are introduced in portions over the course of 10 minutes whilst ensuring, by occasional cooling with ice water, that the temperature does not exceed 45°C. The reaction mixture is stirred for a further 4 hours at 40°-45°C, treated with 400 ml of desalinated water, neutralised with approximately 2 ml of formic acid, heated to the boil and filtered through a pressure filter. The clear filtrate is cooled to approximately 5°C and the product which has crystallised out is isolated by filtration and recrystallised from a mixture of 150 ml of desalinated water and 150 ml of dimethylformamide. After drying in vacuo at 100°-110°C the product is boiled in 200 ml of chlorobenzene for 10 minutes under reflux and is filtered off through a hot pressure filter. The filter residue is suspended in about 100 ml of methanol, filtered off, washed with methanol and dried in vacuo at 100°-110°C. About 4.8 g of the compound of the formula

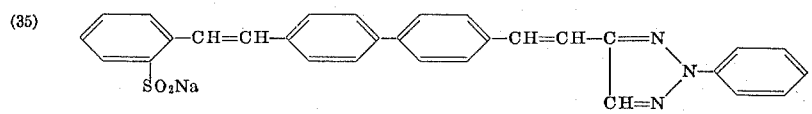

(35)

are obtained. Appearance: pale yellow powder.

To manufacture the compound of the formula (35) it is also possible to employ the equivalent amount of 4,4'-bis-(diethoxyphosphonomethyl)-diphenyl instead of the 4,4'-bis-(dimethoxyphosphonomethyl)-diphenyl used, with an equally good result. Equally it is possible to use potassium hydroxide or sodium hydroxide as the alkaline condensation agent instead of sodium methylate. Finally, dimethylsulphoxide can also be used as the solvent instead of dimethylformamide.

If instead of 22.2 g of the sodium salt of benzaldehyde-2-sulphonic acid 26.0 g of the sodium salt of 2-chlorobenzaldehyde-5-sulphonic acid (content 93.2 percent) are employed, 10.6 g of the compound of the formula

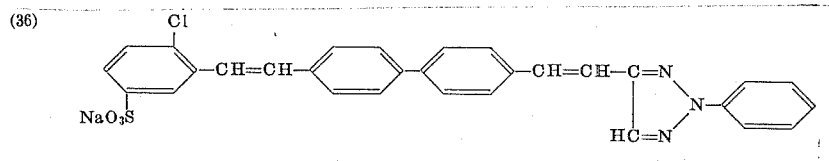

(36)

are obtained as a light yellow powder.

EXAMPLE 2

15.1 g of the sodium salt of 2-phenyl-1,2,3-triazol-4-aldehyde-sulphonic acid and 10.2 g of 4,4'-bis-(dimethoxy-phosphonomethyl)-diphenyl are dissolved in 200 ml of dimethylsulphoxide whilst stirring and displacing the air by nitrogen, and 3.6 of sodium methylate (content: 98.4 percent) are introduced over the course of 5 minutes whilst ensuring, through occasional cooling with ice water, that the temperature does not exceed 45°C. The reaction mixture is stirred for a fyrther 4 hours at 40°-45°C and cooled to 20°C, and the product which has crystallised out is isolated by filtration and recrystallised from a mixture of 900 ml of dimethylformamide and 450 ml of desalinated water. After drying in vacuo at 100°-110°C, about 2.8 g of the compound of the formula

(37) 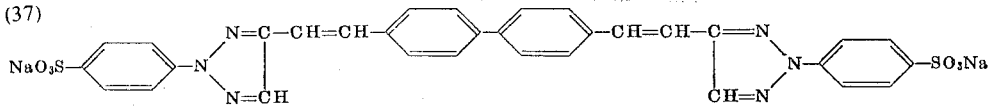

are obtained as a pale yellow powder.

The sodium salt of 2-phenyl-1,2,3-triazol-4-aldehydesulphonic acid which was employed can be obtained as follows: 34.6 g of 2-phenyl-1,2,3-triazol-4-aldehyde are introduced in portions, over the course of 25 minutes, into 160 g of oleum, containing 10 percent of $SO_3$, at room temperature whilst stirring. The dark brown solution is stirred for a further 23 hours at room temperature and is carefully poured out onto 1 kg of ice. A slight cloudiness in the resulting solution is removed by filtration, the clear filtrate is heated to 50°C, 200 g of sodium chloride are added, the mixture is cooled to approx. 10°C and the product which has crystallised out is filtered off and washed first with 2 litres of a solution of 200 g of sodium chloride per litre of desalinated water and then with 1 litre of alcohol. After drying at 100°–110°C in vacuo, about 37.5 g of the compound of the formula

(38) 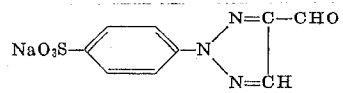

are obtained.

The compounds of the formulae

(39) 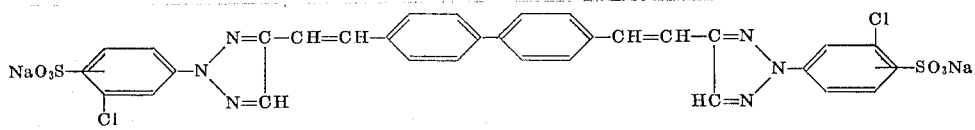

and

(40) 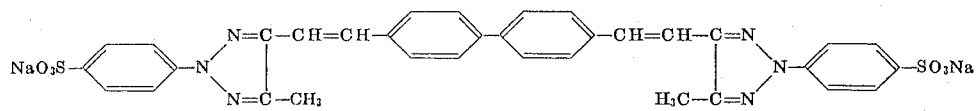

are obtained analogously to the compound of the formula (37).

The sodium salt of the 5-methyl-2-(4-sulphophenyl)-1,2,3-triazol-4-aldehyde employed can be obtained as follows: 7.5 g of 5-methyl-2-phenyl-1,2,3-triazol-4-aldehyde are introduced into 40 ml of oleum, containing 25 percent of $SO_3$, over the course of 20 minutes whilst stirring and ensuring, by cooling with ice water, that the temperature does not exceed 40°C. The brown solution is stirred for a further 4 hours at room temperature and is then poured out onto 300 g of ice. The whole is heated to the boil and 30 g of sodium chloride are added, whereupon the product precipitates. After cooling, the product which has crystallised out is filtered off, stirred with 300 ml of a sodium chloride solution which has been obtained by dissolving 200 g of sodium chloride in one litre of desalinated water, neutralised with a little 30 percent strength sodium hydroxide solution, filtered off, washed with the same sodium chloride solution and dried in vacuo at 100°–110°C. 12.2 g of the compound of the formula

(41) 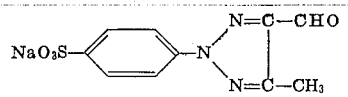

which can be freed of a little admixed sodium chloride by recrystallisation from water are thus obtained.

The sodium salt of the 2-(3-chlorosulphophenyl)-1,2,3-triazol-4-aldehyde employed can be obtained as follows: 8.3 g of 2-(3-chlorophenyl)-1,2,3-triazol-4-aldehyde are introduced into 40 ml of oleum, containing 25 percent of $So_3$, over the course of 15 minutes, during which the temperature rises to 32°C. The reaction mixture is stirred for about 22 hours at room temperature and for 5 hours at 50°–55°C. After cooling to room temperature, the red-brown solution is poured out onto 250 g of ice and the resulting solution is heated to the boil, treated with 50 g of sodium chloride and allowed to crystallise out. The product which has crystallised out is filtered off, stirred with 300 ml of a solution of 300 g of sodium chloride in one litre of desalinated water, neutralised with a little 30 percent strength sodium hydroxide solution, filtered off, washed with 300 ml of the same sodium chloride solution and with 100 ml of alcohol and dried in vacuo at 100° – 110°C. 9.0 g of the compound of the formula

(42) 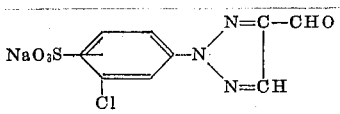

which can be freed of a little admixed sodium chloride by recrystallisation from water are obtained.

EXAMPLE 3

The following compounds of the formula

(43) 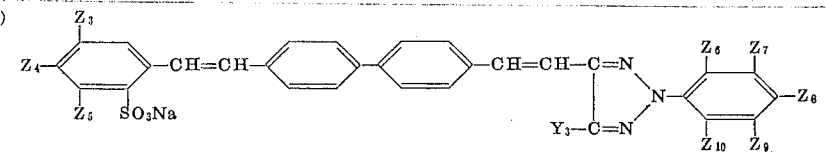

can be manufactured analogously to the description in Example 1.

Table I

| Compound No. | $Y_3$ | $Z_3$ | $Z_4$ | $Z_5$ | $Z_6$ | $Z_7$ | $Z_8$ | $Z_9$ | $Z_{10}$ |
|---|---|---|---|---|---|---|---|---|---|
| (44) | —CH$_3$ | —H | —H | —H | —H | —H | —H | —H | —H |
| (45) | —H | —H | —H | —H | —H | —Cl | —H | —H | —H |
| (46) | —H | —H | —H | —H | —H | —H | —CH$_3$ | —H | —H |
| (47) | —H | —Cl | —H | —H | —H | —H | —H | —H | —H |
| (48) | —H | —H | —Cl | —H | —H | —H | —H | —H | —H |
| (49) | —H | —H | —H | —H | —H | —H | —H | —CH$_3$ | —H |
| (50) | —H | —H | —H | —H | —H | —OCH$_3$ | —H | —H | —H |
| (51) | —H | —H | —H | —H | —H | —F | —H | —H | —H |
| (52) | —H | —H | —H | —H | —H | —H | —F | —H | —H |
| (53) | —H | —H | —H | —H | —H | —H | —Cl | —H | —H |
| (54) | —H | —H | —H | —H | —H | —CH$_3$ | —Cl | —H | —H |
| (55) | —H | —H | —H | —H | —H | —Br | —H | —H | —H |
| (56) | —H | —H | —H | —H | —H | —H | —Br | —H | —H |
| (57) | H | H | H | H | H | Br | Br | H | H |
| (58) | H | H | H | H | CH$_3$ | H | Br | H | H |
| (59) | H | H | H | H | H | —CH$_3$ | Br | H | H |
| (60) | H | H | H | H | H | H | —C$_2$H$_5$ | H | H |
| (61) | H | H | H | H | H | —CH$_3$ | CH$_3$ | H | H |
| (62) | H | H | H | H | H | Cl | Br | H | H |
| (63) | H | H | SO$_3$Na | H | H | H | H | H | H |
| (64) | H | H | H | H | CH$_3$ | H | H | CH$_3$ | H |
| (65) | CH$_3$ | H | H | H | H | H | Br | H | H |

EXAMPLE 4

Bleached cotton fabric is washed for 15 minutes, using a liquor ratio of 1:20, in a liquor at 50°C which contains the following additives per litre: 0.004 to 0.016 g of the brightener of the formula (35), 0.25 g of active chlorine (bleach solution) and 4 g of a washing powder of the following composition: 15.00 percent of dodecylbenzenesulphonate, 10.00 percent of sodium laurylsulphonate, 40.00 percent of sodium tripolyphosphate, 25.75 percent of anhydrous sodium sulphate, 7.00 percent of sodium metasilicate, 2.00 percent of carboxymethylcellulose and 0.25 percent of ethylenediaminetetraacetic acid.

The cotton fabric is here only introduced into the washing liquor at 50°C 15 minutes after the liquor has been prepared. After rinsing and drying, the fabric shows a good brightening effect of good fastness to acid, light and chlorine.

A good brightening effect is also achieved if the washing process is carried out in the same manner for 15 minutes at 25°C.

The washing powder of the abovementioned composition can also contain the brighteners directly incorporated into it.

If instead of the compound of the formula (35) a compound of the formulae (44) to (50), (53), (60), (61) or (64) is employed, very similar effects are obtained.

EXAMPLE 5

A polyamide fibre fabric (Perlon Helanca) is washed for 15 minutes, using a liquor ratio of 1:20, in a liquor at 50°C which contains the following additives per litre: 0.004 to 0.016 g of one of the brighteners of the formula (35), (36), (44) to (50), (53), (60), (61) or (64), 0.25 g of active chlorine (liquid bleach), and 4 g of a washing powder of the following composition: 15.00 percent of dodecylbenzenesulphonate, 10.00 percent of sodium laurylsulphonate, 40.00 percent of sodium tripolyphosphate, 25.75 percent of anhydrous sodium sulphate, 7.00 percent of sodium metasilicate, 2.00 percent of carboxymethylcellulose and 0.25 percent of ethylenediaminetetraacetic acid.

The polyamide fibre fabric is only introduced into the washing liquor at 50°C, 15 minutes after preparation of the liquor.

After rinsing and drying, the fabric displays a good brightening effect of good fastness to light.

A good brightening effect is also obtained if the washing process is carried out in the same manner, but at 25°C.

The washing powder of the abovementioned composition can also contain the brighteners directly incorporated into it.

EXAMPLE 6

A polyamide fibre fabric (Perlon) is introduced, using a liquor ratio of 1:40, into a bath at 60°C which contains (relative to the weight of the fabric) 0.1 percent of one of the brighteners of the formula (35), (36), (37), (39), (40), (44) to (50), (53), (60), (61) or (64) and, per litre, 1 g of 80 percent strength acetic acid and 0.25 g of an addition product of 30 to 35 mols of ethylene oxide to one mol of technical stearyl alcohol. The bath is warmed to the boil over the course of 30 minutes and is kept at the boil for 30 minutes. After rinsing and drying, a good brightening effect is achieved.

If instead of the polyamide-6 fabric a polyamide-66 (Nylon) fabric is used, similar brightening effects are obtained.

Finally, the process can also be carried out under high temperature conditions, for example for 30 minutes at 130°C. For this type of application, it is advisable to add 3 g of hydrosulphite/l to the liquor.

EXAMPLE 7

10,000 g of a polyamide in chip form, manufactured in a known manner from hexamethylenediamine adipate, are mixed for 12 hours in a tumbler vessel with 30 g of titanium dioxide (rutile modification) and 5 g of one of the compounds of the formulae (35), (36), (37), (39), (40), (44) to (50), (53), (60), (61) or (64). The chips treated in this way are fused in a kettle heated to 300°-310°C with oil or diphenyl vapour after having displaced the atmospheric oxygen by steam, and are stirred for half an hour. The melt is thereafter extruded under a nitrogen pressure of 5 atmospheres gauge to a spinneret and the filament which has been spun in this way and cooled is wound up on a spinning bobbin. The filaments obtained show a good brightening effect.

If instead of a polyamide manufactured from hexamethylenediamine adipate a polyamide manufactured from ε-caprolactam is employed, similarly good results are obtained.

EXAMPLE 8

Bleached cotton fabric is washed for 30 minutes at 60° to 95°C, using a liquor ratio of 1:20. The washing liquor contains the following additives per litre: 0.04 g of one of the brighteners of the formula (35), (36), (37), (39), (40), (44) to (50), (53), (60), (61) or (64) and 4 g of a washing powder of the following composition: 40.0 percent of soap flakes, 15.0 percent of sodium tripolyphosphate, 8.0 percent of sodium perborate, 1.0 percent of magnesium silicate, 11.0 percent of sodium metasilicate (9 $H_2O$), 24.6 percent of calcined sodium carbonate and 0.4 percent of ethylenediaminetetraacetic acid.

After rinsing and drying, the cotton fabric displays a strong brightening effect.

EXAMPLE 9

Bleached wool fabric is treated for 60 minutes, using a liquor ratio of 1:40, in a bath which contains 0.1 to 0.4 percent of one of the brighteners of the formula (35), (44) to (50), (53), (60), (61) or (64), calculated relative to the fibre weight, and 4 g/l of hydrosulphite. After rinsing and drying, strong brightening effects of good fastness to light are obtained.

Equally strong brightening effects are obtained if instead of the hydrosulphite 5 percent of acetic acid, calculated relative to the fibre weight, are added to the bath.

EXAMPLE 10

A fabric of cellulose acetate is introduced, using a liquor ratio of 1:30 to 1:40, into an aqueous bath at 50°C which contains 0.15 percent of one of the compounds of the formulae (35), (44) to (50), (53), (60), (61) or (64), calculated relative to the fibre material. The temperature of the treatment bath is brought to 90°–95°C and is maintained thereat for 30 to 45 minutes. After rinsing and drying, a good brightening effect is obtained.

EXAMPLE 11

A cotton fabric article which has been provided with a non-iron finish by means of an aminoplast resin is washed for 15 minutes, using a liquor ratio of 1:20, in a liquor at 40°C which contains the following additives per litre: 0.004 to 0.016 g of one of the brighteners of the formula (35), (44) to (50), (53), (60), (61) or (64), and 4 g of a washing powder of the following composition: 15.00 percent of dodecylbenzenesulphonate, 10.00 percent of sodium laurylsulphonate, 40.00 percent of sodium tripolyphosphate, 25.75 percent of anhydrous sodium sulphate, 7.00 percent of sodium metasilicate, 2.00 percent of carboxymethylcellulose and 0.25 percent of ethylenediaminetetraacetic acid.

After rinsing and drying, the fabric shows a higher degree of whiteness in daylight than does untreated material.

EXAMPLE 12

A bleached cotton fabric is introduced, using a liquor ratio of 1:25, into a bath at 20°C which contains (relative to the fabric weight) 0.1 to 0.2 percent of one of the brighteners of the formula (35), (44) to (50), (53), (60), (61) or (64). The bath is warmed to 50°C over the course of 15 minutes and 5 g of crystalline sodium sulphate are then added per litre of liquor. After a further 15 minutes, the fabric is briefly rinsed and subsequently dried. The cotton treated in this way shows a good brightening effect.

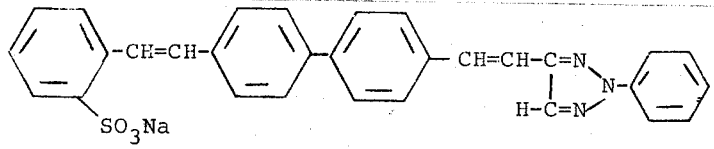

We claim:

1. A compound of formula

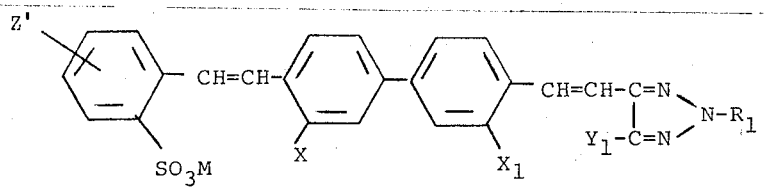

where
Z' is hydrogen, halogen, alkyl of 1 to 4 carbon atoms, alkenyloxy of 3 or 4 carbon atoms, alkoxy of 1 to 4 carbon atoms, benzyloxy or —$SO_3M$, M is a hydrogen, alkali metal, alkaline earth metal, ammonium or amine X and $X_1$ each independently are hydrogen, halogen, alkyl of 1 to 4 carbon atoms alkoxy of 1 to 4 carbon atoms or —$SO_3M$ $Y_1$ is hydrogen, chlorine, bromine, alkyl of 1 to 6 carbon atoms or an aryl group selected from phenyl, naphthyl and diphenylyl, said aryl group being unsubstituted or substituted by —$SO_3M$, halogen, alkyl of 1 to 4 carbon atoms alkenyloxy of 3 or 4 carbon atoms, alkoxy of 1 to 4 carbon atoms or benzyloxy $R_1$ is phenyl that is unsubstituted or substituted by —$SO_3M$, halogen, alkyl of 1 to 4 carbon atoms, alkenyloxy of 3 or 4 carbon atoms, alkoxy of 1 to 4 carbon atoms or benzyloxy, and where said compound contains no more than 4 —$SO_3M$ groups.

2. A compound of formula

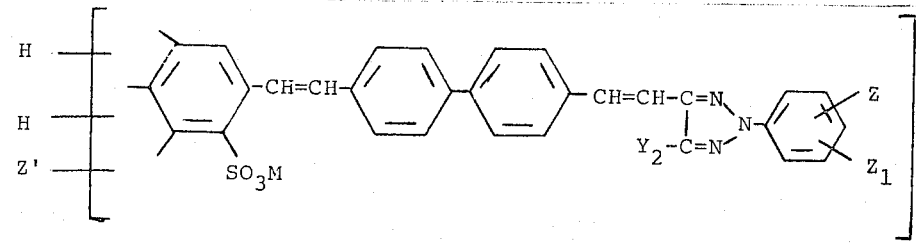

where

Z and Z′ each independently is hydrogen —SO$_3$M, fluorine, chlorine, bromine, alkyl of 1 to 4 carbon atoms or alkoxy of 1 to 4 carbon atoms, Z$_1$ is hydrogen, fluorine, chlorine, bromine, alkyl of 1 to 4 carbon atoms or alkoxy of 1 to 4 carbon atoms, Y$_2$ is hydrogen, chlorine, alkyl of 1 to 4 carbon atoms, phenyl or phenyl substituted by chlorine, alkyl of 1 to 4 carbon atoms, alkoxy of 1 to 4 carbon atoms or —SO$_3$M, and where said compound contains no more than 4-SO$_3$M groups.

3. A compound according to claim 2 wherein Y$_2$ is hydrogen or methyl.

4. A compound according to claim 2 where
Z′ is hydrogen, methyl, chloro or -SO$_3$M
M is hydrogen, sodium or potassium
Y$_2$ is hydrogen or methyl,
Z is hydrogen, fluorine, chlorine, bromine, methyl, ethyl or methoxy
Z$_1$ is hydrogen, bromine or methyl.

5. A compound according to claim 4 in which
Z′ is hydrogen or chlorine and
Y$_2$, Z and Z$_1$ are hydrogen.

6. The compound of formula